United States Patent
Chen et al.

(10) Patent No.: US 10,639,850 B2
(45) Date of Patent: May 5, 2020

(54) METHOD FOR PLANNING 3D PRINTING PATH BASED ON FERMAT'S SPIRAL

(71) Applicant: Shandong University, Jinan (CN)

(72) Inventors: Baoquan Chen, Jinan (CN); Daniel Cohen-Or, Tel Aviv (IL); Hao Zhang, Jinan (CN); Haisen Zhao, Jinan (CN)

(73) Assignee: Shandong University, Jinan (CN)

( * ) Notice: Subject to any disclaimer, the term of this patent is extended or adjusted under 35 U.S.C. 154(b) by 52 days.

(21) Appl. No.: 16/044,343

(22) Filed: Jul. 24, 2018

(65) Prior Publication Data

US 2018/0326669 A1    Nov. 15, 2018

Related U.S. Application Data (63) Continuation of application No. PCT/CN2016/084383, filed on Jun. 1, 2016.

(30) Foreign Application Priority Data

Apr. 19, 2016  (CN) .......................... 2016 1 0242579

(51) Int. Cl.
| | | |
|---|---|---|
| *B29C 64/393* | (2017.01) | |
| *B33Y 50/00* | (2015.01) | |
| *B29C 67/00* | (2017.01) | |
| *B29C 64/386* | (2017.01) | |
| *B33Y 50/02* | (2015.01) | |

(Continued)

(52) U.S. Cl.
CPC .......... *B29C 64/393* (2017.08); *B22F 3/1055* (2013.01); *B29C 64/386* (2017.08); *B29C 67/00* (2013.01); *B33Y 50/00* (2014.12); *B33Y 50/02* (2014.12); *G05B 19/4099* (2013.01); *B22F 2003/1057* (2013.01); *G05B 2219/49023* (2013.01)

(58) Field of Classification Search
None
See application file for complete search history.

(56) References Cited

U.S. PATENT DOCUMENTS

| | | | |
|---|---|---|---|
| 9,305,352 B2 | 4/2016 | Jenzri et al. | |
| 2015/0266244 A1 | 9/2015 | Page | |
| 2016/0209820 A1* | 7/2016 | Banadyga | .......... G05B 19/4099 |

FOREIGN PATENT DOCUMENTS

| | | |
|---|---|---|
| CN | 1881256 A | 12/2006 |
| CN | 1967423 A | 5/2007 |

(Continued)

*Primary Examiner* — Sean Shechtman
(74) *Attorney, Agent, or Firm* — Knobbe, Martens, Olson & Bear, LLP (57) ABSTRACT

The present invention discloses a method of planning a 3D printing path based on Fermat's spiral. The method comprises generating a plurality of iso-contours for a given topological connected region, wherein adjacent iso-contours of the plurality of iso-contours have a set spacing therebetween. The method also comprises constructing a spiral connected graph according to the plurality of iso-contours and generating a spiral connected tree according to the spiral connected graph. The method further comprises connecting a subset of the plurality of iso-contours according to the spiral connected tree to form a connected Fermat spiral. The method additionally comprises smoothing the connected Fermat spiral through a global optimization method based on a width of the printing path being consistent.

10 Claims, 7 Drawing Sheets

(51) Int. Cl.
*B22F 3/105* (2006.01)
*G05B 19/4099* (2006.01)

(56) References Cited

FOREIGN PATENT DOCUMENTS

| | | |
|---|---|---|
| CN | 101125391 A | 2/2008 |
| CN | 101145247 A | 3/2008 |
| CN | 103894608 A | 7/2014 |
| CN | 104148636 A | 11/2014 |
| CN | 104175556 A | 12/2014 |
| CN | 104325638 A | 2/2015 |
| CN | 104573390 A | 4/2015 |
| CN | 204366037 U | 6/2015 |
| WO | WO 2015 133138 A1 | 9/2015 |

\* cited by examiner

METHOD FOR PLANNING 3D PRINTING PATH BASED ON FERMAT'S SPIRAL

CLAIM OF PRIORITY UNDER 35 U.S.C. § 120

The present Application is a continuation of PCT Application No. PCT/CN2016/084383 entitled "METHOD FOR PLANNING 3D PRINTING PATH BASED ON FERMAT'S SPIRAL" filed Jun. 1, 2016, which claims the priority benefit of Chinese Application No. 201610242579.1 entitled "METHOD FOR PLANNING 3D PRINTING PATH BASED ON FERMAT'S SPIRAL" filed Apr. 19, 2016, each of which is hereby expressly incorporated by reference herein in its entirety.

FIELD OF THE INVENTION

The present invention relates to three-dimensional (3D) printing. Specifically, the present invention relates to a 3D printing path planning method.

BACKGROUND OF THE INVENTION 3D printing is an emerging manufacturing technology of extruding a material layer by layer to manufacture physical objects based on digital models and is also referred to as additive manufacturing (AM). 3D printing, in which any complex 3D digital models can be input, is suitable for the manufacture of customizable products. In recent years, rapid development of 3D printing technologies has presented many opportunities and challenges to academia and related industries. 3D printing technologies are usually based on a discrete-stacking principle to manufacture the physical objects by extruding a material layer by layer. According to different printing materials and implementation processes, various 3D printing technologies can be divided into five types: (1) high-energy beam sintering and melting molding of a powder or filament material, e.g., selective laser sintering (SLS) and selective laser melting (SLM); (2) photocuring molding of liquid resin, e.g., stereo lithography appearance (SLA), digital light processing (DLP), etc.; (3) extrusion hot melt molding of wires, e.g., fused deposition modeling (FDM), etc.; (4) bonding or welding molding of sheets/boards/blocks, e.g., Laminated Object Manufacturing (LOM), etc.; and (5) liquid spray printing molding, e.g., three dimensional printing (3DP), etc.

A common 3D printing process includes three-dimensional (3D) digital model generation, data format conversion, slice calculation, printing path planning and 3D printing. The 3D digital model generation is the basis of the entire 3D printing process, and a 3D digital model is generated generally using a variety of 3D modeling software (e.g., CAD software) or 3D scanning equipment. The 3D digital model is subjected to a data format conversion process and then transmitted. Currently, a common data format that is often used in 3D printing is the stereolithography (STL) file format. The slice calculation process is to "cut" the 3D model into slices. In order to materialize the slices generated in the slice calculation process, the path of a print head needs to be planned. The 3D printing material is converted into physical slices during the movement of the print head. Finally, a 3D printer prints (for example, extrudes material) according to the above-mentioned slices and print head path control information, until a complete object is formed.

The path planning is a key step in the overall 3D model printing process. For any topological connected region, the existing path planning methods, such as a Zigzag method, may fill the region using multiple printing paths. Frequent on-off switching of the print head may severely affect the printing quality. On the other hand, the generated printing path may have many corners that are less than or close to 90 degrees, and sharp turns of the print head may seriously affect printing time and printing quality of the printed object.

SUMMARY

In order to solve the above problems, an aspect of the present invention proposes a 3D printing path planning method based on a Fermat spiral, according to which any topological connected region is divided into multiple independent sub-regions by adopting a divide-and-rule method to fill Fermat spirals respectively, then the plurality of independent Fermat spirals are connected to generate a continuous printing path, and the printing path is smoothed by adopting a global optimization method under the constraint of keeping the width of the printing path consistent.

In order to achieve the above objective, the present invention adopts a method for planning a 3D printing path. The method is based on a Fermat spiral. The method comprises generating a plurality of iso-contours for a given topological connected region, wherein adjacent iso-contours of the plurality of iso-contours have a set spacing therebetween. The method also comprises constructing a spiral connected graph according to the plurality of iso-contours and generating a spiral connected tree according to the spiral connected graph. The method further comprises connecting a subset of the plurality of iso-contours according to the spiral connected tree to form a connected Fermat spiral and smoothing the connected Fermat spiral through a global optimization method based on a width of the printing path being consistent.

In some aspects, each generated iso-contour of the plurality of iso-contours is expressed by a combination of (1) a distance from the respective iso-contour to a boundary of the given topological connected region and (2) an index among the plurality of iso-contours with the distance.

In some aspects, constructing a spiral connected graph according to the plurality of iso-contours and generating a spiral connected tree according to the spiral connected graph comprises constructing a weighted spiral connected graph according to the plurality of iso-contours and selecting a minimum spanning tree (MST) generated from the spiral connected graph as the spiral connected tree.

In some aspects, in constructing the weighted spiral connected graph according to the plurality of iso-contours, each iso-contour of the plurality of iso-contours corresponds to one node in the spiral connected graph, and, if a connected edge of an iso-contour of the plurality of iso-contours relative to an adjacent iso-contour of the plurality of iso-contours is non-empty, the spiral connected graph has an edge connecting the nodes of the iso-contour and the adjacent iso-contour, wherein a weight value of the edge is the length of the connected edge.

In some aspects, connecting a subset of the plurality of iso-contours according to the spiral connected tree to form a connected Fermat spiral comprises decomposing the spiral connected tree into multiple independent Fermat spiral subtrees and trunk nodes, connecting iso-contours that correspond to the Fermat spiral subtrees to generate a sub Fermat spiral, connecting the sub Fermat spiral with iso-contours that correspond to the trunk nodes associated with the sub Fermat spiral, and connecting the iso-contours corresponding to the trunk nodes.

In some aspects, in decomposing the spiral connected tree into multiple independent Fermat spiral subtrees and trunk nodes, in the spiral connected tree, first nodes of which degrees are less than or equal to two degrees are defined as type I nodes, second nodes of which degrees are greater than two degrees are defined as type II nodes, and connected type I nodes are connected into different Fermat spiral subtrees.

In some aspects, connecting iso-contours that correspond to the Fermat spiral subtrees to generate a sub Fermat spiral comprises connecting the iso-contours that correspond to the Fermat spiral subtrees to generate a sub spiral and generating a corresponding sub Fermat spiral from the sub spiral.

In some aspects, connecting the iso-contours that correspond to the Fermat spiral subtrees to generate a sub spiral comprises selecting an enter-point on an outermost iso-contour corresponding to the Fermat spiral subtrees, starting from the enter-point, connecting two adjacent iso-contours into a continuous line, and connecting all the iso-contours that correspond to the Fermat spiral subtrees into the sub spiral.

In some aspects, smoothing the connected Fermat spiral through a global optimization method based on a width of the printing path being consistent comprises dynamically selecting sample points based on a curvature of each position of the connected Fermat spiral, constructing a global optimization function, setting penalties for penalty terms of a magnitude of perturbations on the sample points, a degree of smoothness, and a degree of spacing maintenance, and calculating an optimal solution of the global optimization function through an iterative Gaussian-Newton optimization method.

In some aspects, in dynamically selecting sample points based on the curvature of each position of the connected Fermat spiral, more sample points are selected at a first position having a larger curvature than at a second position having a smaller curvature than the first position.

Embodiments of the present invention have the following beneficial effects:

(1) A continuous printing path can be generated for any topological connected region, and the print head does not need any on-off switching operation in the printing process, which is beneficial to improving the printing quality;

(2) Compared with the conventional Zigzag method, the proposed path planning method for generating the continuous printing path reduces the number of corners that are less than or close to 90 degrees, and is beneficial to reducing the printing time;

(3) The present invention can be directly used for a fused deposition modeling (FDM) printer, is beneficial to improving the object printing quality of the FDM printer and reducing the required printing time, and has an effect of promoting the development of the FDM printer;

(4) The present invention can be transformed according to the basic knowledge in the art to be applied to SLS, SLM, SLA, DLP, LOM and other types of printers, thus being widely applicable;

(5) The present invention is particularly suitable for applications in the fields of bio-printing, printing of metal materials for aerospace and the like, which require high internal quality of printed objects, and is beneficial to improving the internal printing quality;

(6) In the present invention, a print head path having both characteristics of continuousness and smoothness is generated based on a Fermat spiral for any topological connected region, thereby significantly improving the printing quality and reducing the printing time.

DETAILED DESCRIPTION

The present invention will be further illustrated below in conjunction with the accompanying drawings and embodiments.

Figure 1:
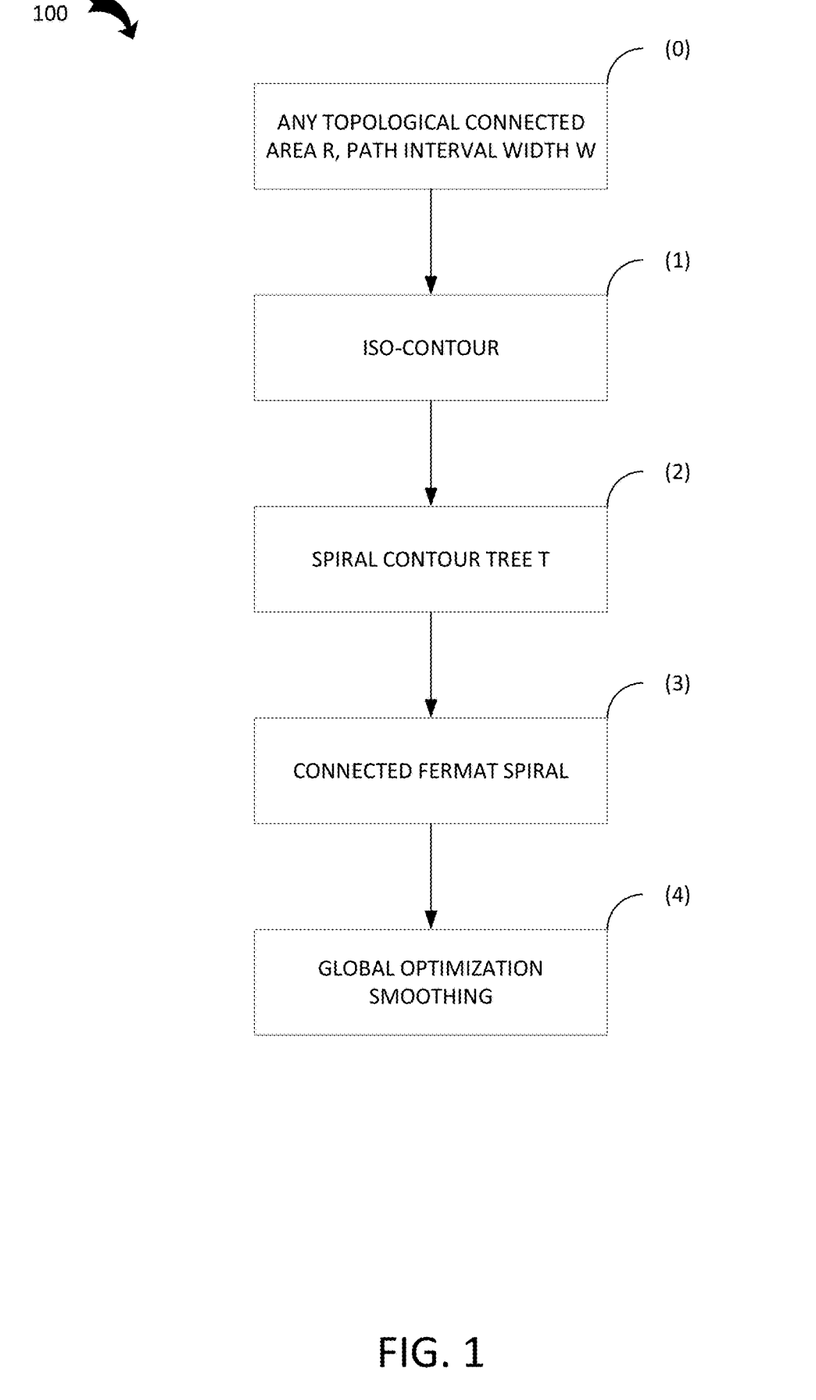
FIG. 1 is a flow diagram of the present invention.
Figure 2A:
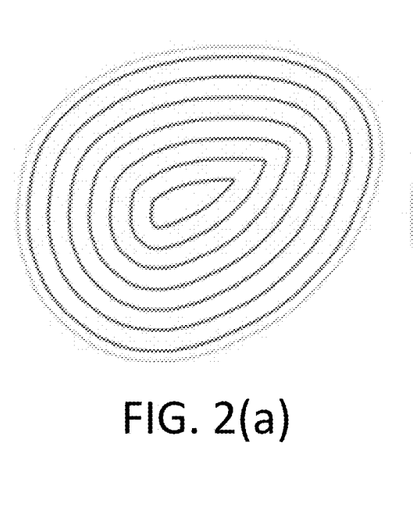
FIG. 2(a) to FIG. 2(c) are analytical diagrams of a spiral generation process.

As shown in FIG. 1, a path planning method 100 for 3D printing includes the following steps. At step (1), the method 100 includes generating iso-contours at a spacing, w, for a given topological connected region, R, as shown in FIG. 2(a). At step (2), the method 100 includes generating a spiral connected tree, T, according to the iso-contours. At step (3), the method 100 includes connecting the iso-contours to generate a connected Fermat spiral according to the generated spiral connected tree, T. At step (4), the method 100 includes smoothing the generated connected Fermat spiral by adopting a global optimization method under the constraint that the width of the printing path is consistent.

In step (1), each iso-contour generated is expressed by $c_{i,j}$, wherein i indicates the distance $d(\partial R)=(i-0.5)w$ from the corresponding iso-contour to the boundary of the given topological connected region, and j is an index among all iso-contours with the distance i. The connected edge of the iso-contour $c_{i,j}$ relative to the $c_{i+1,j'}$ is defined as: $O_{i,j,j'}=\{p\in C_{i,j}|d(p,c_{i+1,j'})<d(p,c_{i+1,k}), k\neq j'\}$.

Figure 4A:
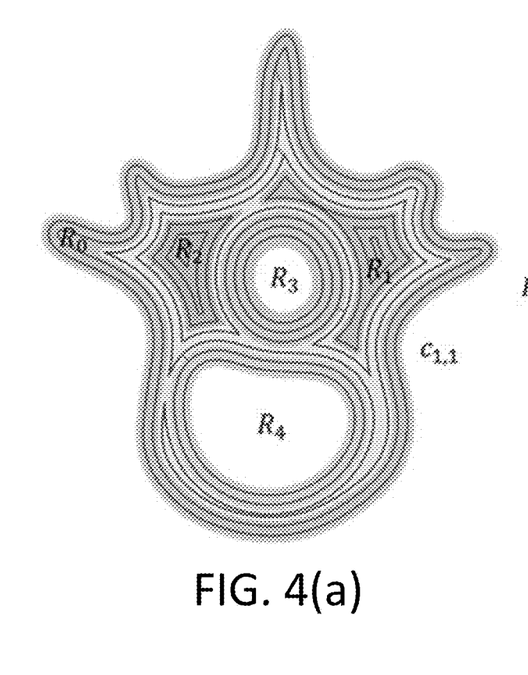
FIG. 4(a) to FIG. 4(c) are analytical diagrams of a connected Fermat spiral generation process.
Figure 4B:
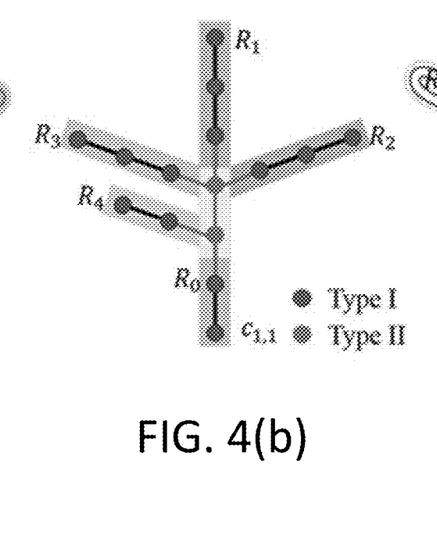
Figure 4C:
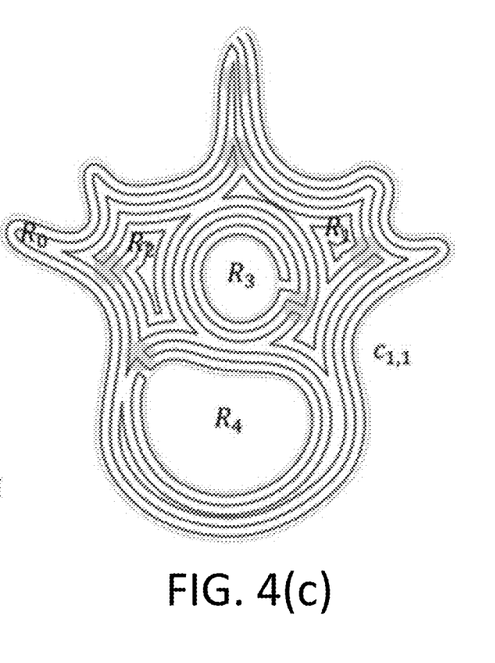

In step (2), the specific method of generating a spiral connected tree according to the iso-contours includes (2-1) constructing a weighted spiral connected graph, G, according to the iso-contours and (2-2) selecting a minimum spanning tree generated from the spiral connected graph as the spiral connected tree T, as shown in FIG. 4(b).

In step (2-1), each iso-contour corresponds to one node in the spiral connected graph, and if the connected edge $O_{i,j,j'}$ of the iso-contour $c_{i,j}$ relative to the $c_{i+1,j'}$ is non-empty, the spiral connected graph has an edge connecting the nodes $c_{i,j}$ and $c_{i+1,j'}$, wherein the weight value of the edge is the length of the connected edge $O_{i,j,j'}$.

In step (3), the specific method of connecting the iso-contours to generate a connected Fermat spiral includes (3-1) decomposing the spiral connected tree into multiple independent Fermat spiral subtrees and trunk nodes; FIG. 4(b) is a spiral connected tree T generated from FIG. 4(a). In the spiral connected tree T, all the nodes of which degrees are less than or equal to 2 are defined as Type I nodes, and the nodes of which degrees are greater than 2 are defined as Type II nodes, or referred to as trunk nodes, as shown in FIG. 4(b). The connected Type I nodes form a Fermat spiral subtree. As shown in FIG. 4(b), five Fermat spiral subtrees $R_0$, $R_1$, $R_2$, $R_3$, and $R_4$ are obtained by decomposition. The nodes not covered by the $R_0$, $R_1$, $R_2$, $R_3$, and $R_4$ in FIG. 4(b) are trunk nodes.

Figure 3A:
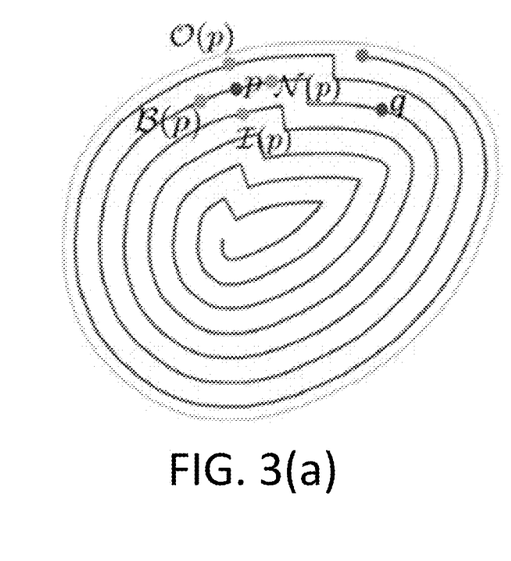
FIG. 3(a) to FIG. 3(c) are analytical diagrams of a Fermat spiral generation process.
Figure 3B:
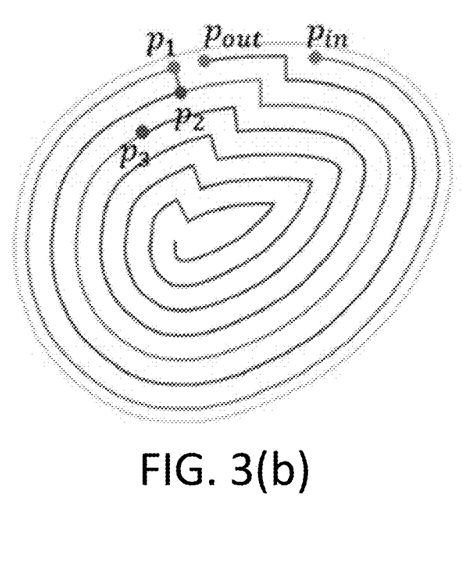
Figure 3C:
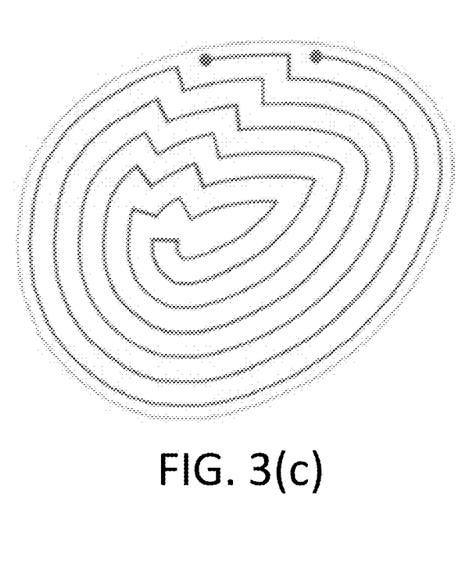

The specific method of connecting the iso-contours to generate a connected Fermat spiral further includes (3-2) connecting the iso-contours corresponding to the Fermat spiral subtrees to generate a sub Fermat spiral, as shown in FIG. 3(a) to FIG. 3(c), (3-3) connecting the sub Fermat spiral with the iso-contours corresponding to the trunk nodes associated with the sub Fermat spiral, and (3-4) connecting the iso-contours corresponding to the trunk nodes.

Figure 2B:
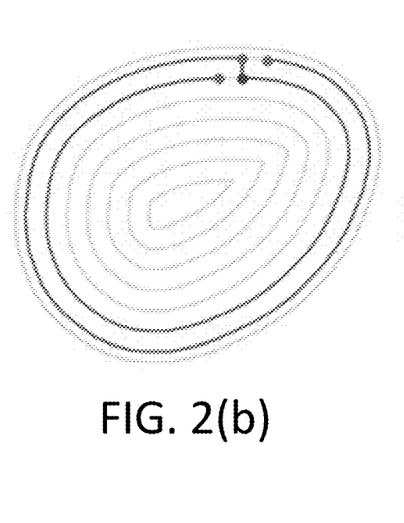
Figure 2C:
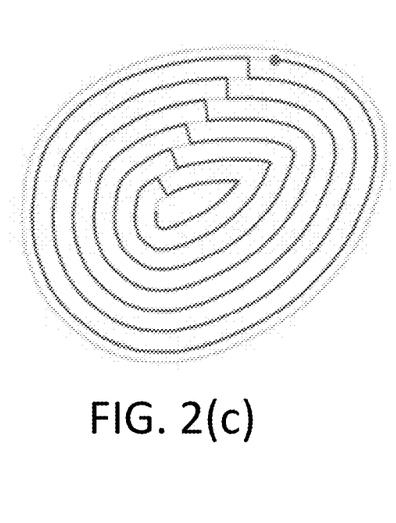

In step (3-2), the specific method of connecting the iso-contours corresponding to the Fermat spiral subtrees to generate a sub Fermat spiral includes (3-2-1) connecting the iso-contours corresponding to the Fermat spiral subtrees to generate a sub spiral. As shown in FIG. 2(b), first select an enter-point on the outermost iso-contour corresponding to the Fermat spiral subtrees, and starting from this point, connect two adjacent iso-contours into a continuous line through a method shown in the figure. Finally, connect all the iso-contours corresponding to the Fermat spiral subtrees into a sub spiral, as shown in FIG. 2(c).

In step (3-2), the specific method of connecting the iso-contours corresponding to the Fermat spiral subtrees to generate a sub Fermat spiral also includes (3-2-2) generating a corresponding sub Fermat spiral from the sub spiral. As shown in FIG. 3(a), the sub spiral has a point p, let $c_{i,j}$ be the iso-contour where the point, p, is located, where $c_{i,j}$ is the kth iso-contour corresponding to the Fermat spiral subtrees. The first iso-contour corresponding to the Fermat spiral subtrees is defined here as the outermost iso-contour, and the last one is the innermost iso-contour. As shown in FIG. 3(a), O(p) is defined as a closest point on the (k−1)th iso-contour from the point p, I(p) is a closest point on the (k+1)th iso-contour from the point p, N(p) is a point at a geodesic distance, w, from the point p along the advancing direction of the sub spiral, and B(p) is a point at the geodesic distance w from the point p along the direction opposite to the advancing direction of the sub spiral.

As shown in FIG. 3(b), a point $p_{out}$ on the outermost iso contour corresponding to the Fermat spiral subtrees is determined as an exit-point of the sub Fermat spiral, and $p_{in}$ is an enter-point of the sub Fermat spiral. First, it starts from the point $p_{in}$ until arriving at the point $p_1=B(p_{out})$, then arrives at the corresponding point $p_2=I(B(p_{out}))$ inside the $p_1=B(p_{out})$, continues along the advancing direction of the sub spiral until encountering the point $p_3=B(I(B(p_{out})))$, and then reaches the corresponding point inside the point $p_3$. This rule is followed until the end of the sub spiral is encountered, and the sub spiral is finally converted into a sub Fermat spiral.

Figure 5A:
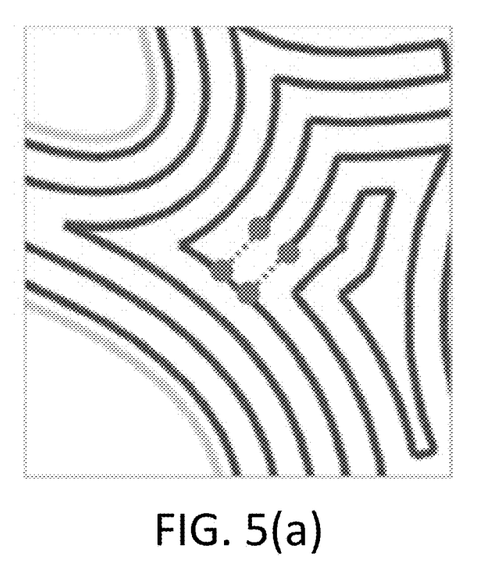
FIG. 5(a) and FIG. 5(b) are analytical diagrams of connecting a sub Fermat spiral with associated trunk nodes thereof.
Figure 5B:
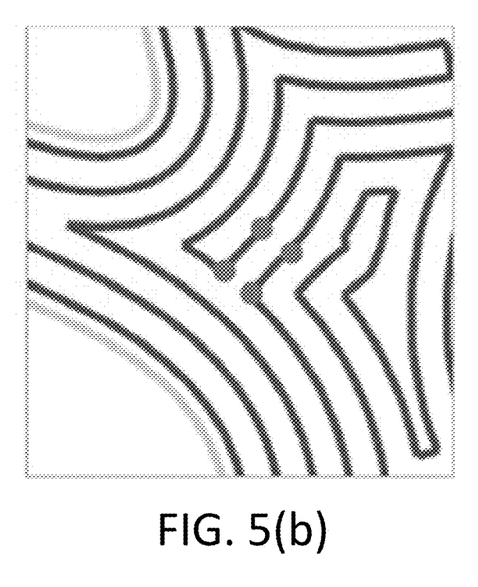
Figure 6:
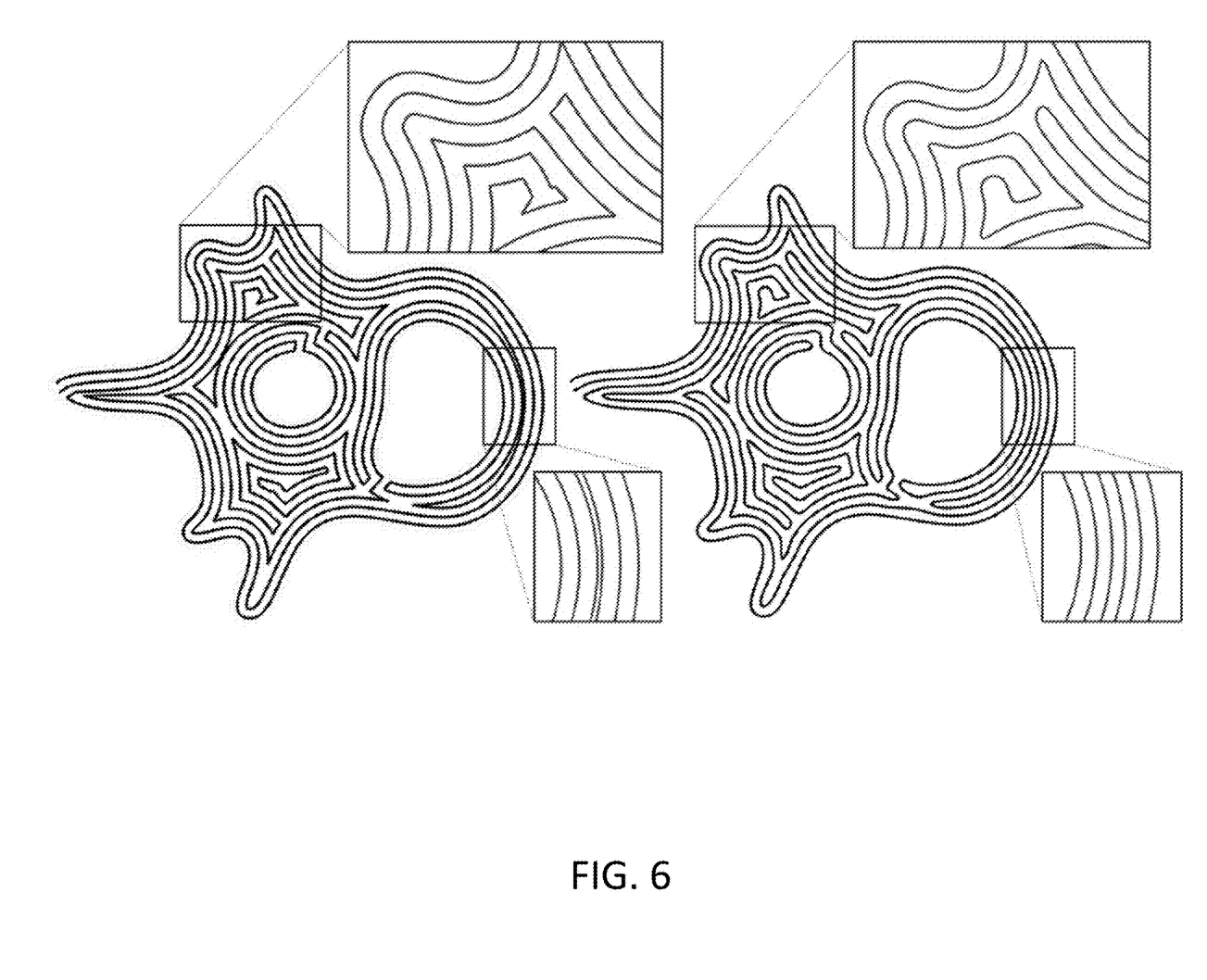
FIG. 6 is a diagram showing a global optimization effect.

In step (3-3), the sub Fermat spiral is connected with the iso-contours corresponding to the trunk nodes associated with the sub Fermat spiral. As shown in FIG. 5(a) and FIG. 5(b), the enter-point and the exit-point of the sub Fermat spiral are connected with the closest points on the iso-contours corresponding to its associated trunk nodes respectively, thus completing the connection of the sub Fermat spiral with the iso-contours corresponding to its associated trunk nodes.

In step (3-4), the iso-contours corresponding to the two trunk nodes are connected as shown in FIGS. 5(a) and 5(b).

In step (4), the specific method of smoothing the generated connected Fermat spiral includes (4-1) dynamically selecting sample points based on the curvature of each position of the connected Fermat spiral, with the purpose that more sample points are selected at the position having a larger curvature, and fewer sample points are selected at the position having a smaller curvature, wherein the selected sample points are $p_1^0, \ldots, p_N^0$. The specific method of smoothing the generated connected Fermat spiral also includes (4-2) performing local position perturbations on the sample points under the constraint that the width of the printing path is kept consistent to achieve the objective of smoothing the generated path and constructing a global optimization function, including three penalty terms for punishment with respect to the magnitude of the perturbations on the sample points, the degree of smoothness and the degree of spacing maintenance.

An equation $f_{regu}=\Sigma_{i=1}^{N}|p_i p_i^0|^2$ the penalty term for the magnitude of the perturbations on the sample points, wherein $p_1, \ldots, p_N$ are the sample points, and $|p_i p_i^0|$ is the length of the edge. The penalty term for the degree of smoothness is expressed as: $f_{smooth}=\Sigma_{i=1}^{N-2}\|(1-u_i)p_i + u_i p_{i+2} - p_{i+1}\|^2$, wherein $u_i=u_i=|p_{i+1}^0 p_i^0|/(p_{i+1}^0 p_i^0|+|p_{i+2}^0 p_{i+1}^0|)$.

Figure 7A:
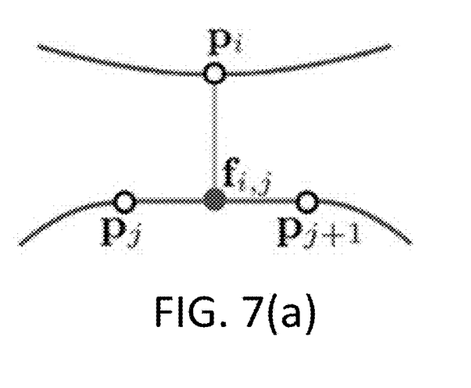
FIG. 7(a) and FIG. 7(b) are analytical diagrams of closest points of adjacent paths.

For each point $p_i$, there are two cases of its closest points on the adjacent paths. In the first case, such a closest point is a point on the edge of the adjacent path, as shown in FIG. 7(a); and in the second case, such a closest point is a vertex on the edge of the adjacent path, as shown in FIG. 7(b).

Figure 7B:
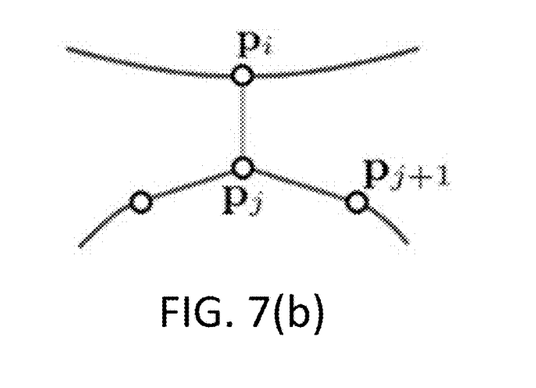

As shown in FIG. 7(b), in the second case, the closest point can be expressed as: $f_{i,j}=(1-t_{i,j})p_j+t_{i,j}p_{j+1}$, and thus, $$t_{i,j} = \frac{(p_i - p_j)^T(p_j - p_{j+1})}{|p_j p_{j+1}|^2},$$

$0 \leq t_{i,j} \leq 1$. $\varepsilon=\{(p_i,p_j,p_{j+1})\}$ is defined. The closest fixed point $p_j$ solved in the first case certainly satisfies $0 \leq t_{i,j} \leq 1$, and then $V=\{p_i,p_j\}$. The penalty term that defines the degree of spacing maintenance is: $f_{space}=\Sigma_{(p_i,p_j,p_{j+1})\in\varepsilon}(|p_i f_{ij}|-d)^2 + \Sigma_{(p_i,p_j)\in V}(|p_i p_j|-d)^2$. In summary, the global optimization objective function is:

$$\underset{p_1, \ldots p_N}{\text{minimize}} f_{requ} + \alpha f_{smooth} + \beta f_{space}.$$

α is a parameter that controls the degree of smoothness, and β is a parameter that controls the degree of spacing maintenance, generally, α=200, and β=1.0.

The specific method of smoothing the generated connected Fermat spiral also includes (4-3) calculating an optimal solution of the optimization function through an iterative Gauss-Newton optimization method.

The above-mentioned global optimization objective function contains both a discrete component (ε, V) and a continuous component ($f_{requ}$), and the patent adopts iterative optimization thereof in sequence. When a fixed point is fixed, the discrete component ε, V is calculated. When the discrete component ε, V is fixed, the global optimization objective function is solved using the Gauss-Newton method.

The entire optimization process is usually completed only by 4-8 iterations.

Although the specific embodiments of the present invention are described above in combination with the accompanying drawings, the protection scope of the present invention is not limited thereto. It should be understood by those skilled in the art that various modifications or variations that could be made by those skilled in the art based on the technical solution of the present invention without any creative effort shall fall into the protection scope of the present invention.

The invention claimed is:

1. A method of planning a 3D printing path for controlling a 3D printer to print an object, the method comprising:
    generating a plurality of iso-contours for a given topological connected region, wherein adjacent iso-contours of the plurality of iso-contours have a set spacing therebetween;
    constructing a spiral connected graph according to the plurality of iso-contours;
    generating a spiral connected tree according to the spiral connected graph;
    generating the 3D printing path based on connecting a subset of the plurality of iso-contours according to the spiral connected tree to form a connected Fermat spiral; and
    smoothing the 3D printing path through a global optimization method based on a width of the printing path being consistent; and
    controlling a path of a print head of the 3D printer according to the 3D printing path to print the object.

2. The method of claim 1, wherein each generated iso-contour of the plurality of iso-contours is expressed by a combination of (1) a distance from the respective iso-contour to a boundary of the given topological connected region and (2) an index among the plurality of iso-contours with the distance.

3. The method of claim 1, wherein constructing a spiral connected graph according to the plurality of iso-contours and generating a spiral connected tree according to the spiral connected graph comprises:
    constructing a weighted spiral connected graph according to the plurality of iso-contours; and
    selecting a minimum spanning tree (MST) generated from the weighted spiral connected graph as the spiral connected tree.

4. The method of claim 3, wherein in constructing a weighted spiral connected graph according to the plurality of iso-contours, each iso-contour of the plurality of iso-contours corresponds to one node in the spiral connected graph, and, if a connected edge of an iso-contour of the plurality of iso-contours relative to an adjacent iso-contour of the plurality of iso-contours is non-empty, the spiral connected graph has an edge connecting the nodes of the iso-contour and the adjacent iso-contour, wherein a weight value of the edge is the length of the connected edge.

5. The method of claim 1, wherein connecting a subset of the plurality of iso-contours according to the spiral connected tree to form a connected Fermat spiral comprises:
    decomposing the spiral connected tree into multiple independent Fermat spiral subtrees and trunk nodes;
    connecting iso-contours that correspond to the Fermat spiral subtrees to generate a sub Fermat spiral;
    connecting the sub Fermat spiral with iso-contours that correspond to the trunk nodes associated with the sub Fermat spiral; and
    connecting the iso-contours corresponding to the trunk nodes.

6. The method of claim 5, wherein in decomposing the spiral connected tree into multiple independent Fermat spiral subtrees and trunk nodes, in the spiral connected tree, first nodes of which degrees are less than or equal to two degrees are defined as type I nodes, second nodes of which degrees are greater than two degrees are defined as type II nodes, and connected type I nodes are connected into different Fermat spiral subtrees.

7. The method of claim 5, wherein connecting iso-contours that correspond to the Fermat spiral subtrees to generate a sub Fermat spiral comprises:
    connecting the iso-contours that correspond to the Fermat spiral subtrees to generate a sub spiral; and
    generating a corresponding sub Fermat spiral from the sub spiral.

8. The method of claim 7, wherein connecting the iso-contours that correspond to the Fermat spiral subtrees to generate a sub spiral comprises:
    selecting an enter-point on an outermost iso-contour corresponding to the Fermat spiral subtrees;
    starting from the enter-point, connecting two adjacent iso-contours into a continuous line, and connecting all the iso-contours that correspond to the Fermat spiral subtrees into the sub spiral.

9. The method of claim 1, wherein smoothing the connected Fermat spiral through a global optimization method based on a width of the printing path being consistent comprises:
    dynamically selecting sample points based on a curvature of each position of the connected Fermat spiral;
    constructing a global optimization function;
    setting penalties for penalty terms of a magnitude of perturbations on the sample points, a degree of smoothness, and a degree of spacing maintenance; and
    calculating an optimal solution of the global optimization function through an iterative Gaussian-Newton optimization method.

10. The method of claim 9, wherein in dynamically selecting sample points based on the curvature of each position of the connected Fermat spiral, more sample points are selected at a first position having a larger curvature than at a second position having a smaller curvature than the first position.

* * * * *